(12) United States Patent
Charuckyj et al.

(10) Patent No.: US 6,679,993 B1
(45) Date of Patent: Jan. 20, 2004

(54) PROCESS FOR THE REMOVAL OF SUSPENDED AND OTHER MATERIAL FROM WASTE WATER

(75) Inventors: Leonid Charuckyj, West Brunswick (AU); Peter Cooksey, Fern Bay (AU)

(73) Assignee: Zeolite Australia Limited, South Melbourne (AU)

( * ) Notice: Subject to any disclaimer, the term of this patent is extended or adjusted under 35 U.S.C. 154(b) by 0 days.

(21) Appl. No.: 09/913,012

(22) PCT Filed: Feb. 11, 2000

(86) PCT No.: PCT/AU00/00093

§ 371 (c)(1), (2), (4) Date: Oct. 30, 2001

(87) PCT Pub. No.: WO00/47525

PCT Pub. Date: Aug. 17, 2000

(30) Foreign Application Priority Data

Feb. 11, 1999 (AU) .............................................. PP8608

(51) Int. Cl.[7] .................................................. C02F 3/00
(52) U.S. Cl. ........................ 210/616; 210/739; 210/805; 210/800; 210/631
(58) Field of Search ................................. 210/616, 617, 210/618, 615, 739, 767, 805, 800, 196, 631

(56) References Cited

U.S. PATENT DOCUMENTS

| | | | |
|---|---|---|---|
| 4,099,871 A | | 7/1978 | Sunahara et al. |
| 5,569,634 A | * | 10/1996 | Miller et al. .................. 502/64 |
| 6,395,522 B1 | * | 5/2002 | DeFilippi et al. ............ 435/180 |

FOREIGN PATENT DOCUMENTS

| | | |
|---|---|---|
| DE | 198 07 406 | 6/1998 |
| EP | 0 446 542 | 9/1991 |
| WO | WO 85/04390 | 10/1985 |
| WO | WO 87/5592 | 9/1987 |

OTHER PUBLICATIONS

Derwent Abst. Acc. No. 81–0691126; Kurary, Nov. 27, 1990.
Derwent Abstr. Acc. No. 80–57695C/33; Kobe—Jun. 30, 1980.
Derwent Abstr. Acc. No. 89–098061/13; Nichias—Feb. 21, 1989.
Derwent Abstr. Acc. No. 95–227663/30; TG Sensa—May 30, 1995.
Derwent Abstr. Acc. No. 88–033577/05; Toyo Soda—Dec. 21, 1987.
Derwent Abstr. Acc. No. 87–017657/03; Meidensha—Apr. 12, 1986.
Japatic Abstr. JP 60153996—Meidensha—Aug. 13, 1985.
Japatic Abstr. JP 60028889—Meidensha—Feb. 14, 1985.
Japatic Abstr. JP 55044332—Hitachi—Mar. 28, 1980.
Japatic Abstr. JP 05269485—Takaoka—Oct. 19, 1993.
Japatic Abstr. JP 05031489—Meidensha—Feb. 9, 1993.
Japatic Abstr. JP 03004994—Meidensha—Jan. 10, 1991.
Japatic Abstr. JP 59173196—Meidensha—Oct. 1, 1984.

* cited by examiner

*Primary Examiner*—Chester T. Barry
(74) *Attorney, Agent, or Firm*—Larson & Taylor PLC

(57) ABSTRACT

The present invention provides a process for treating waste water in a reactor in order to remove contaminants, including: mixing the waste water with a biomass, the biomass for consuming a quantity of the contaminants or adsorbing the contaminants; dosing the waste water with a micronized zeolitic material; mixing the zeolitic material with the biomass; allowing solids to settle from the waste water; and discharging resultant effluent, wherein a significant portion of the micronized zeolite material has a grain size less than or equal to 100 μm.

12 Claims, 4 Drawing Sheets

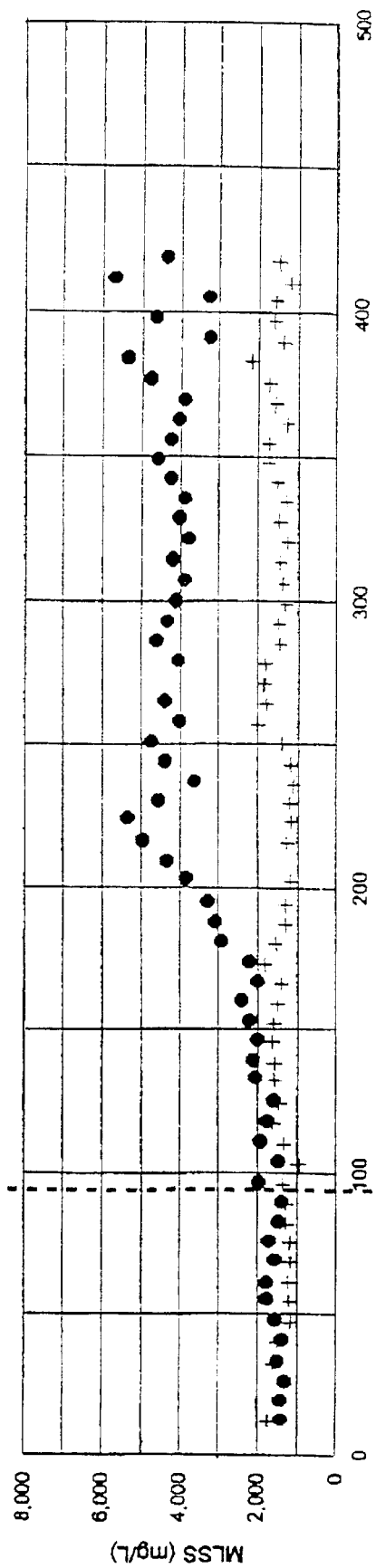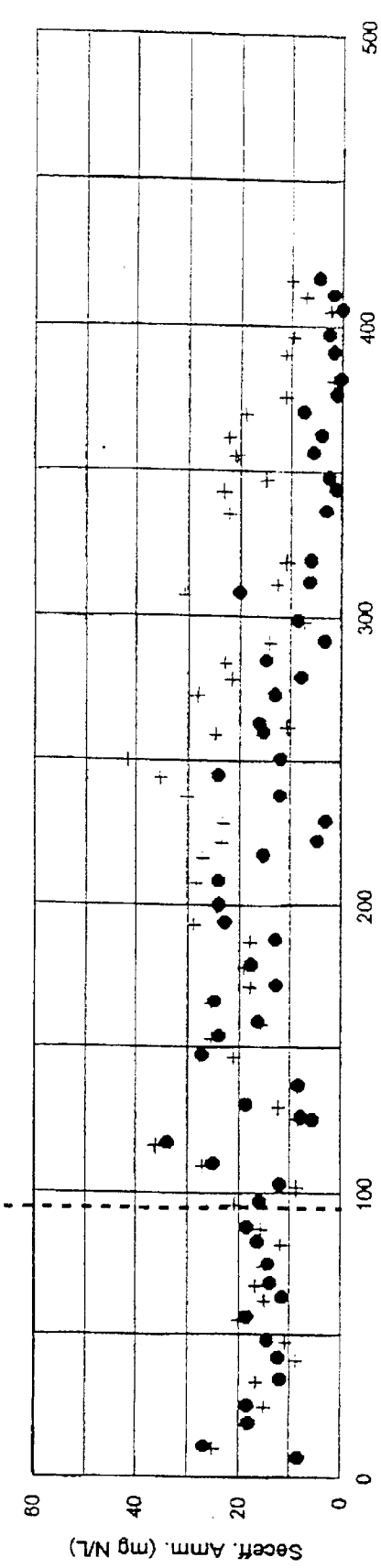
FIGURE 5
FIGURE 6

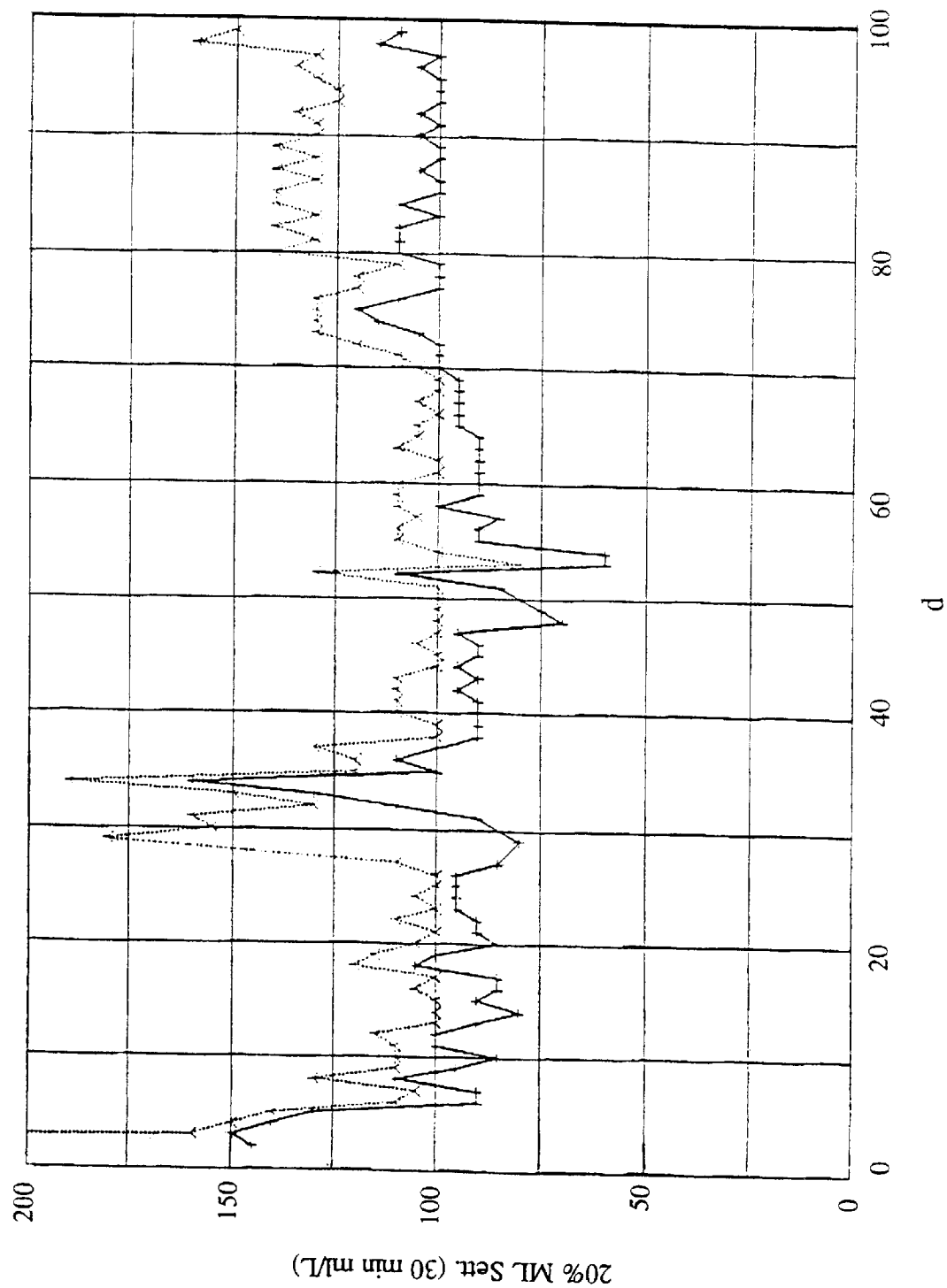

PROCESS FOR THE REMOVAL OF SUSPENDED AND OTHER MATERIAL FROM WASTE WATER

The present invention relates to the removal of contaminants, particularly suspended and organic materials, from waste water, and is of particular but by no means exclusive application in the purification of sewage.

Existing processes for the treatment of waste water, for the removal of suspended material and other contaminants, include mechanical, biological and physico-chemical processes, or combinations of these. Mechanical processes include filtration techniques, or the removal of solid suspensions through settling and differences in specific gravities. Biological techniques employ microorganisms to remove contaminants, particularly dissolved organic substances, from the liquid waste by incorporation into a biomass which is more easily separated from the liquid stream than the original contaminants. A significant portion of this biomass is generally converted to inorganic materials either before or after separation from the liquid stream. Physico-chemical techniques exploit the reactivity of certain minerals or other chemicals with organic or inorganic contaminants and may be used, for example, to supplement a biological purification technique, such as by chemical addition for improved precipitation and/or flocculation (e.g. the addition of lime for pH adjustment).

One existing physico-chemical technique is described in EP 177543, which discloses a process for the removal of suspended solids, biogenic nutrients and dissolved metal compounds from water contaminated with organic and/or inorganic substances, by dosing a completely mixed type activated sludge reactor with an agent of grain size less than 200 $\mu$m and other characteristics specified in that document, and which contains a minimum of 50 mass percent of rock granules containing at least 25 mass percent finely ground natural zeolite containing preferably clinoptilolite and/or mordenite. In a preferred form of the technique disclosed in this European Patent, sewage is passed through a primary settling tank, followed by a mixing tank and then an absorption zone, and an aeration basin, and finally through a secondary settling tank. In the settling tank, primary effluent and activated sludge are separated and a fraction of the settled sludge is recirculated into the mixing tank.

Zeolite of specified grain size is fed into the mixing tank so that the water leaving the secondary settling tank has a considerably decreased level of suspended material. Pretreated sewage leaving the secondary settling tank is led through one of several zeolite beds that are filled with suitably prepared material of proper grain size and of high clinoptilolite and/or mordenite content.

These beds are flushed with purified water to remove sludge floccules from the upper layers; the flush-water is then fed back to the primary settling tank.

However, existing processes (employing various suspended growth media, including ground zeolite) have a number of disadvantages including that the growth media are separated from waste sludge prior to disposal, may usually be of synthetic manufacture, and do not have optimal surface area and pore volume characteristics. The process of EP 177543 does not separate the growth media from the waste sludge prior to disposal, it proceeds only up to a complete biological oxidation of contaminating carbon compounds.

Processes of this kind depend on the settleability of suspended material in the waste water. A particle of matter in suspension in a liquid will tend to settle under quiescent conditions if the specific gravity of the particle is greater than that of water. Passage of the particle through the liquid will be resisted by frictional forces, and hence the settling rate will be appreciable only if there is a reasonable difference in specific gravity between the particle and the liquid.

Activated sludge is a flocculant suspension consisting predominantly of bacteria. Because bacterial density is very close to that of water individual bacteria will not settle, and separation of activated sludge from water is dependant on the formation of aggregates containing many bacteria (i.e. flocs).

The way in which flocs settle depends on both their nature/quality and their concentration in the liquid. Many settleability parameters have been proposed in an effort to measure sludge quality as a specific entity unrelated to concentration, but with limited success.

In the course of such physico-chemical processes, the settleability of the sludge may be used to determine the sludge quality and hence optimize treatment of the sludge. Numerous parameters are used for assessment of the settleability of activated sludges, but unfortunately most of these fail to define sludge quality unambiguously, and even when supplemented by additional information regarding the test conditions the results are often not very helpful.

Part of the problem is that available parameters are often applied for purposes other than those for which they were intended, while in some cases standardisation of procedures leads to improved consistency in measurement at the expense of applicability to operating situations.

As with quality parameters in general, different parameters are required for different aspects of settleability. The permissible rise rate in clarifiers, for example, relates directly to the settling rate of the sludge while satisfactory decant of intermittently aerated plants depends on the distance the sludge has settled before decant commenced (and not necessarily on whether it did this at a uniform rate or not).

The most commonly used parameters for assessment of activated sludge settleability are:

the sludge volume index (SVI)

the stirred sludge volume index (SSVI)

the mass concentration of suspended solids (MLSS)

parameters known as $V_0$ and n (or k), which are used to determine the "steady rate" settling velocity of the sludge at various concentrations.

Both SVI and SSVI suffer from difficulties in that they are affected by sludge concentration to an extent which is not completely predictable (and hence they do not uniquely identify the quality of the sludge).

$V_0$ and n do seem to reflect the quality of a given sample of sludge, but the test procedure is laborious and may not result in unambiguous values, particularly if not carried out over a suitable range of sludge concentrations. There is also little information available on the changes in $V_0$ and n response to changes in plant conditions. As such, there are some doubts about application of the results to operating situations.

A number of researchers have attempted correlations between $V_0$ and n and either SVI or SSVI, and—while general correlations do seem possible—true correlation should probably not be expected because the parameters do not really measure the same thing (reasonable correlation being a reflection of influence by similar factors rather than a true relationship).

The shortcomings with SVI were addressed by Stobbe (1964), who recognised that the SVI is essentially independent of concentration at low sludge concentrations and developed the Diluted Sludge Volume Index (DSVI). However, the DSVI may, in practice, be dependant on the concentration of the sludge under examination, and so may not produce a unique value.

It is also recognized that different types of settling occur, and four distinct settling 'zones' have been designated on the basis of floc behaviour. These are known as: 1) the free settling zone, 2) the hindered settling zone, 3) the compression zone, and 4) the transition zone. Not all settleability parameters are appropriate in all zones.

Thus, care must be taken in employing settleability parameters that can correctly represent the characteristics of the particular settling zone being dealt with. In addition, the applicable regime of any particular settleability parameter depends on a number of factors. For example, when using SVI it is necessary to determine the MLSS of the sample (which is usually not possible on site); at low to moderate MLSS, the SVI increases with MLSS, but with a proportionality that is difficult to predict for any given MLSS; and there is a maximum SVI which cannot be exceeded and this maximum decreases as the MLSS increases. As a consequence of this changing maximum SVI, samples that settle poorly appear to approve in SVI as MLSS increases, but in reality remain poor settling sludges.

One existing method for overcoming this last limitation of the SVI (due to the effects of the MLSS concentration) determines the SVI at a specified MLSS, such as 3,500 mg/L. This is usually done by testing a variety of dilutions, and extrapolating to the required concentration, but thereby increases the amount of testing required. This procedure is satisfactory provided that the sludge settles reasonably well around the specified MLSS, but is of little value is settleability is low at the specified MLSS.

It should also be noted that it is at all times desirable to minimise the amount of testing required to determine settleability, as running such tests are both time consuming and expensive owing to the cost of the experimental equipment. For example, a cylinder and stirrer for conducting a settleability measurement may cost around AU$1,200.

Thus, it is an object of the present invention to provide an improved process for removing dissolved and suspended material waste water. It is further object of the present invention to provide an improved process for optimizing such a process by means of an improved sludge settleability parameter.

The present invention provides, therefore, a process for treating waste water in a reactor in order to remove contaminants, including:

mixing said waste water with a biomass, said biomass for consuming a quantity of said contaminants or adsorbing said contaminants;

dosing said waste water with a micronized zeolitic material;

mixing said zeolitic material with said biomass;

allowing solids to settle from said waste water;

discharging resultant effluent; and maintaining said zeolitic material at a sufficient level relative to said biomass to allow colonization of said zeolitic material by micro-organisms;

wherein a significant portion of said micronized zeolite material has a grain size less than or equal to 100$\mu$m and said zeolitic material acts as a suspended growth support carrier for said micro-organisms.

Preferably said zeolitic material is natural zeolite.

Thus, the process of the present invention employs micronised zeolite (i.e. of particles size less than 100 $\mu$m) to act as a suspended growth-support carrier for micro-organisms in the waste water. As presently understood, the zeolitic material promotes aggregation of sewage matter (and especially micro-organisms) suspended in the waste water. The micro-organisms colonise the surface and pores of the zeolitic material and metabolise organic and nitrogenous substances which are attracted to the zeolite particles by adsorption or cationic exchange, or other mechanisms. It has been surprisingly found that micronised zeolite provides unexpected advantages over the use of zeolite in a merely ground form: micronised zeolite appears to provide an optimal surface area for such adsorption and other mechanisms to take place, and a significant fraction of the micronised material is retained in a suspended state. Micronisation at this level also appears to lead to a homogenous suspension in water for both mixing and dosing purposes. Further, the process of the present invention continues beyond oxidation of carbon to oxidation of nitrogen and to denitrification, whereas—as discussed above—the process EP 177543, for example, proceeds only up to a complete biological oxidation of contaminating carbon compounds.

The biomass preferably comprises microscopic organisms.

The reactor may consist of one or more compartments, and the process may include recycling the biomass from one compartment to another.

A portion of the biomass may be aerobic, anoxic or anaerobic, or a mixture of these, or may be one of these during part of the process but not during other parts of the process.

The micronised material may be added as a dry powder or as a slurry. The micronised material may be added at a uniform rate, or adjusted to match waste water inflow rate, or added in slug doses once or a number of times.

The process may include dosing directly into a reactor in which the process is performed, or into a sludge recirculation line, or into a channel, pipe or container upstream of the reactor.

The process may include separating said solids in the reactor during a period of quiescence or in a separator unit, such as a clarifier, into which the contents of the reactor have previously been transferred for separation.

The process preferably includes monitoring the settleability of the solids.

The process may include retaining the biomass in the reactor for from about one to two days up to about thirty to forty days or longer, and regularly wasting a proportion of the biomass to compensate for the introduction of new inputs and growth of the biomass. While some immediate benefits may be obtained almost immediately after dosing with the micronised material, it has been surprisingly found that further benefits (which depend on the structure of the biomass) are obtained but do not become apparent until some weeks after dosing commences.

The present invention also provides a method for optimizing the separation of solids from waste water in a waste water treatment process, including:

diluting a plurality of samples of said waste water to different dilutions to form a plurality of diluted samples;

determining the unstirred sludge volume index for each diluted sample;

extrapolating these determinations of unstirred sludge volume index to substantially zero sludge concentration to obtain a zero concentration index;

multiplying the zero concentration index by the concentration of solids in the waste water to obtain a unitless parameter indicative of sludge quality;

controlling the process to minimise this parameter.

This parameter is referred to hereinbelow as the ZF Index. The ZF Index is calculated as follows:

$$\text{ZF Index} = \text{Base SVI} \times \text{MLSS}/10^6$$

where  Base SVI  is the SVI [in mL/gm] of a sample of waste water with concentration approaching zero (determined as described below),
MLSS  is the concentration [in mg/L] of suspended solids in the sample of waste water in question The Base SVI is determined by:
diluting the original sample so as to obtain several sub-samples of known concentration
determining the unstirred sludge volume index for each of these diluted samples
extrapolating these determinations of sludge volume index to substantially zero concentration The SVI at this substantially zero concentration is the Base SVI.

Preferably the ZF Index is held at a value of 0.50 or less, and more preferably at a value of 0.3 or less.

Preferably dilution is with effluent from said process.

Preferably the sludge volume index of each diluted sample is determined using the 30 minute settled level.

In some applications the method may include introducing a time delay in testing the settleability, such as necessitated by testing the settleability away from the reactor or off-site, or by using tap water for dilution rather than effluent. Preferably volumes of one liter are used in the settleability tests, but this may be varied according to available time and equipment and similarly, time or equipment constraints may mean that fewer than five samples are used, but preferably at least five are used.

Good settleability (a very low risk of solids loss into the effluent) will be obtained if the ZF Index is less than about 0.3, while reasonable settleability (a low to moderate risk of solids loss into the effluent) is obtained if the ZF Index is between about 0.3 and about 0.50. As the ZF Index increases the settleability of the sludge decreases, and once this value exceeds about 0.50 there is a very real risk of solids loss into the effluent.

These relationships hold whether the process being monitored is that described above or not; the advantage of the above process is that, under most circumstances, it causes an improvement in the ZF Index.

Once the ZF Index and Base SVI [or zero concentration index] have been determined, an operating MLSS can be calculated which, if adopted, will allow the plant to operate with either "good" or "reasonable" settleability (i.e. which will allow the risk of solids loss into the effluent to be estimated.)

A preferred form of the present invention will now be described, by way of example with reference to the drawings in which:

FIG. 5 is a plot of MLSS in mg/L as a function of time in days for Example 1, both for a method according to preferred embodiment of the present invention and for a control;

FIG. 6 is a plot of the concentration of effluent ammonia in mg of nitrogen per liter as a function of time in days for Example 1, both for a method according to preferred embodiment of the present invention and for a control; and FIG. 7 is a plot of 3.0 minute settled levels in mL/L for 20% mixed liquor (ML) samples as a function of time in days for Example 2, both for a method according to preferred embodiment of the present invention and for a control.

Figure 1:
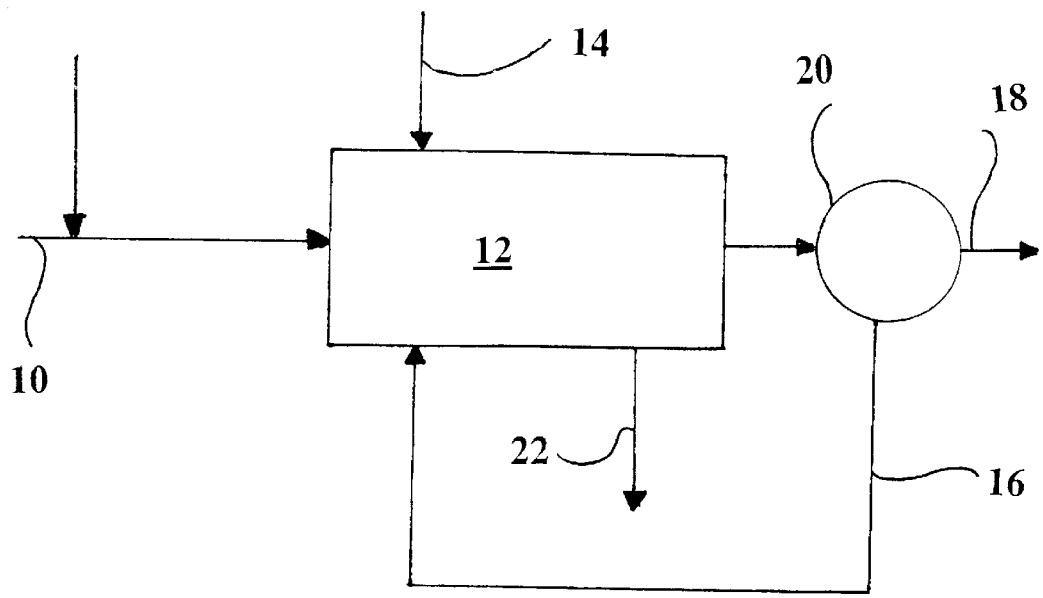
FIG. 1 is schematic representation of a typical layout for a continues flow application of a preferred embodiment of the present invention.

Referring to FIG. 1, influent 10, of sewage or an organic industrial waste, is admitted into a reactor 12, where it is mixed thoroughly with microscopic organisms generally referred to as "biomass" for a sufficient period for significant quantities of contaminants from the influent 10 to be consumed, or adsorbed onto the biomass. The reactor 12 may include several compartments which may be, aerobic, anoxic (i.e. contain oxidised nitrogen but no free oxygen) or an anaerobic and during the process, biomass may be recycled from one compartment to another. Mixing and aeration, where required, is accomplished by one of a number of devices separately or in unison. Such devices may include mechanical surface aerators, submerged mixers, or addition of diffused air.

Micronised material 14, containing a significant proportion of micronised zeolite of particle diameter less than 100 $\mu$m, is added so as to be intimately mixed into the biomass. This material may be added either as the dry powder or as a slurry.

The micronised material 14 may be added directly to the reactor or, to a sludge recirculation line 16. Alternatively, it could be added to a channel, pipe or container upstream of the reactor, provided that the material is intimately mixed into the biomass.

Effluent 18 is discharged from the system after separation of the solids (i.e. the biomass) from the treated liquor in a clarifier 20 into which the contents of the reactor 12 are transferred for separation.

The rate at which solids separate from the liquors is preferably determined by the ZF Index, where the lower the value of the ZF Index the more readily the solids are separated.

The average period of the retention of the biomass in the reactor 12 may be from one to two days up to thirty or forty days. The general quantity of biomass is maintained over this period by regular wasting (i.e. as waste sludge 22, either from the reactor 12 or the sludge recycle stream) to compensate for the addition of new materials and growth of the biomass.

Figure 2:
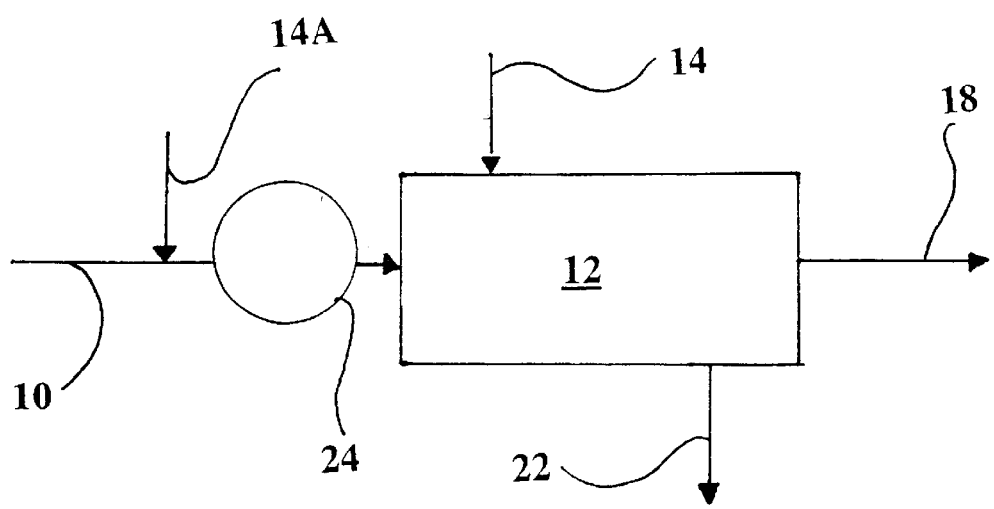
FIG. 2 is a schematic representation of a typical layout for an intermittent decant application embodying a preferred form of the present invention and showing the optional inclusions of primary sedimentation.

FIG. 2 shows an intermittent decant application in which separation of the solids occurs periodically in the reactor 12 by turning off the devices causing turbulence, rather than in a separate clarifier 20 as shown in FIG. 1. Once quiescent conditions have been established, and the biomass has settled well below the liquid surface, effluent 18 is decanted from the surface before turbulent conditions are re-established. In this alternative, aerobic, anoxic and anaerobic conditions in the biomass are frequently varied within the reactor 12 itself rather than by using a number of compartments.

FIG. 2 also illustrates the optional inclusion of primary sedimentation upstream of the reactor 12 in a primary sedimentation tank, and the performance of the primary sedimentation tank can be enhanced by dosing the influent 10 with micronised material 14A, and thoroughly mixing these components, upstream of the primary sedimentation tank 24. Such dosing with additional micronised material 14A upstream of the primary sedimentation tank 24 does not replace the subsequent dosing 14 (to the reactor 12, or to a sludge recirculation line 16) as the dosing 14A is removed in the primary sedimentation step and hence does not come into contact with the biomass in the reactor 12.

In a preferred example of the method for optimizing the separation of the solids, a standard one liter graduated cylinder is filled to the 200 mL level with mixed liquor from a reactor, and then filled to the 1000 mL level with effluent (or, if this is not possible, tap water). The contents of the cylinder are mixed thoroughly, though not vigorously, by up-ending the cylinder three times and then allowing the contents to settle for 30 minutes before reading the settled levels. If this level is below about 300 mL then a reasonable approximation of the ZF Index will be obtained by dividing the 30 minute settled level by 200, but if the level is greater than about 300 mL the test should be repeated using a lower proportion of mixed liquor. Once a level less than about 300 mL has been obtained, the ZF Index can be approximated by dividing the 30 minute settled level by 1000/(sample dilution) [e.g. 1000/10 =100 for a cylinder filled to 100 mL with mixed liquor].

Application of the ZF Index may be in one of a number forms:

Adjustment of the MLSS so that good settleability is obtained in an operating plant.

Monitoring of the ZF Index to determine, against a background of varying MLSS, whether operational changes are resulting in an improvement or deterioration in the settling "quality" of the sludge.

Determination of suitable coefficients for the design of new plants.

Preferably the MLSS would then be adjusted to allow the plant to operate with an acceptable degree of risk of solids loss into the effluent, but it may be the other factors prevent this—such as an adverse combination of plant loading and volume.

The principal advantage of this method is that the ZF Index is essentially independent of the concentration of the samples, but rather reflects changes in the settleability of the sludge. This appears to be so even when the 30 minute settleability of the undiluted mixed liquor is negligible. Thus, the affects of changes in operational procedures, such as in the above process for removing solids from waste water, can be regularly monitored and adjusted accordingly. A further advantage of the ZF Index is in the design of new waste water treatment plants. The present design of such plants is currently based on those sludge properties, generally termed $V_0$ and n, which are relatively time consuming to monitor. Reasonable correlations already exist between $V_0$ and n and the Base SVI, which can no doubt be improved with time. The relative simplicity of testing for Base SVI should allow correlations to be developed between this index and operating conditions. The magnitude of this task can be further reduced by using a combination of Base SVI data and the even simpler ZF Index data rather than Base SVI data alone. The correlation between a limited number of Base SVI determinations and operating conditions can be strengthened if the Base SVI data is combined with intermediate ZF Index data, such as by combining data from one Base SVI determination per week with four ZF Index determinations.

The principal concerns, when assessing the suitability of a plant for implementation of the method of the invention, are the current settleability characteristics of the sludge and the MLSS at which the plant is being operated.

It is difficult to significantly improve plant capacity if the sludge already has good settleability, although it may be possible to provide benefits in other areas, such as improved dewaterability or odour control.

If the plant is being operated at high MLSS, even the improvements in capacity obtained by means of the method of the invention may not be sufficient to provide suitable sludge quality for continued operation. In such cases current operating procedures may first be examined to determine whether the high MLSS is necessary.

If it is found likely, however, that a plant will benefit from the implementation of the method of the invention, a point of high turbulence is preferably identified, suitable for thorough incorporation of the micronized zeolite into the biomass. This often determines whether the micronized zeolite will be dosed as a dry powder or a slurry.

Once it is established that implementation of the method of the invention is desirable and feasible, a more detailed analysis of conditions and desired outcomes can be performed in order to identify possible operational changes. These may be introduced before or after the use of the method, either to assist its implementation or produce greater benefits or economies in the longer term.

It is believed that, in a preferred embodiment, the micronized zeolite should be dosed to a system as a rate suitable to obtain a desired content in the resulting biomass. It seems likely that the content may vary depending on the primary aim of dosing, ranging from as low as 5–10% in some applications to nearly 40% in others. The required dose rate (in mg/L or kg/d) is then calculated based on the MLSS concentration, the sludge age and the hydraulic retention of the system.

EXAMPLE 1

The site included four groups of parallel streams (referred to as Plants 1, 2, 3 and 4), each containing primary sedimentation, aeration, clarification and sludge return facilities owing to the arrangement of sludge return facilities these Plants could not be run independently, but Plants 1 and 2 can be run independently from Plants 3 & 4, providing two streams of approximately equal size and loading. Plants 1 and 2 were operated as controls, by being operated as closely as possible to the conditions under which all four Plants had been previously been operated. Plants 1 and 2 could not be operated at the same sludge age, but this was not expected to invalidate the ability to Plants 1 and 2 to provide satisfactory control results. This assumption was tested, the results confirming its validity (see discussion below and FIG. 3)

The particular micronized zeolitic material employed comprised natural zeolite of predominantly clinoptilolite composition with minor components of quartz, mordenite, clay and mica, ground to a median particle size between 25 and 50 $\mu$m; this composition is referred to hereinafter as "ZELflocc".

ZELflocc was conveyed from a storage silo to the dosing point as a slurry. The ZELflocc was dosed continuously at a uniform rate, with approximately 1.5 tonnes of ZELflocc being added per day.

ZELflocc and biomass were mixed at the return sludge line, and this mixture was conveyed to the upstream end of the aeration tanks by the return sludge stream, where mixing occurred with the primary effluent containing the wastes to be treated.

After passage through the aeration tanks the mixed liquor was separated from the effluent in four clarifiers and returned to the aeration tanks, ZELflocc being progressively added as the biomass once again passed through the return sludge system.

Figure 3:
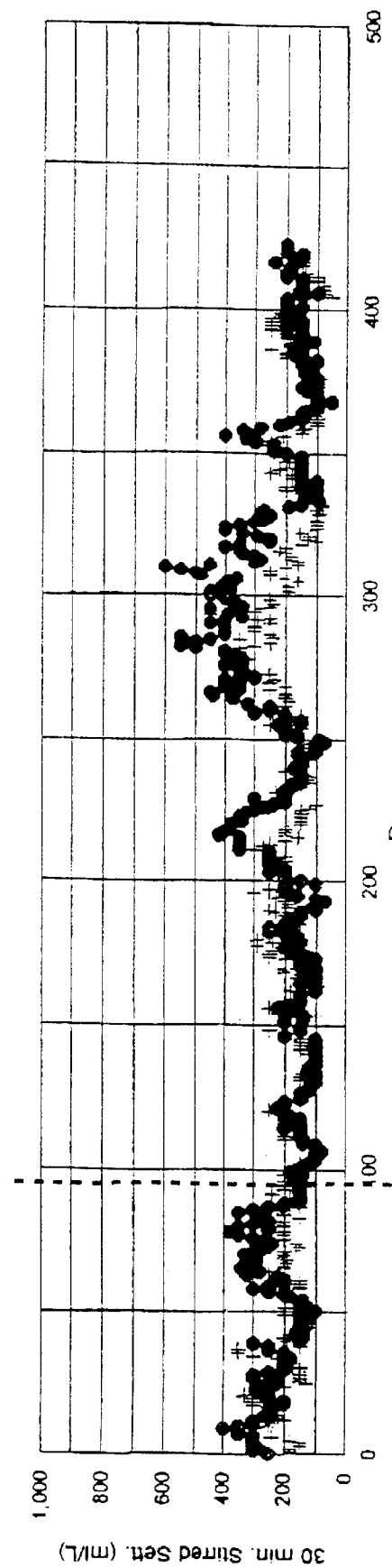
FIG. 3 is a plot of 30 minute stirred settled levels in mL/L as a function of time in days for Example 1, both for a method according to preferred embodiment of the present invention and for a control.

FIG. 3 is a plot of the 30 minute stirred settled levels as a function of time for, respectively, control Plants 1 and 2 (crosses) and Plants 3 and 4 (dots). The dashed vertical line in this and FIGS. 4 to 6 indicates the time at which ZELflocc dosing commenced. In general there is little difference between these results since any improvement in settleability in either Plant 3 or 4 resulted in an increase in its sludge age, a consequent increase in MLSS, and hence a relatively constant 30 minute stirred level. The fact that 30 minute stirred levels in Plants 1 and 2 remained essentially the same before and after ZELflocc dosing was initiated in Plants 3 and 4 demonstrates that Plants 1 and 2 acted as controls in the intended manner.

Figure 4:
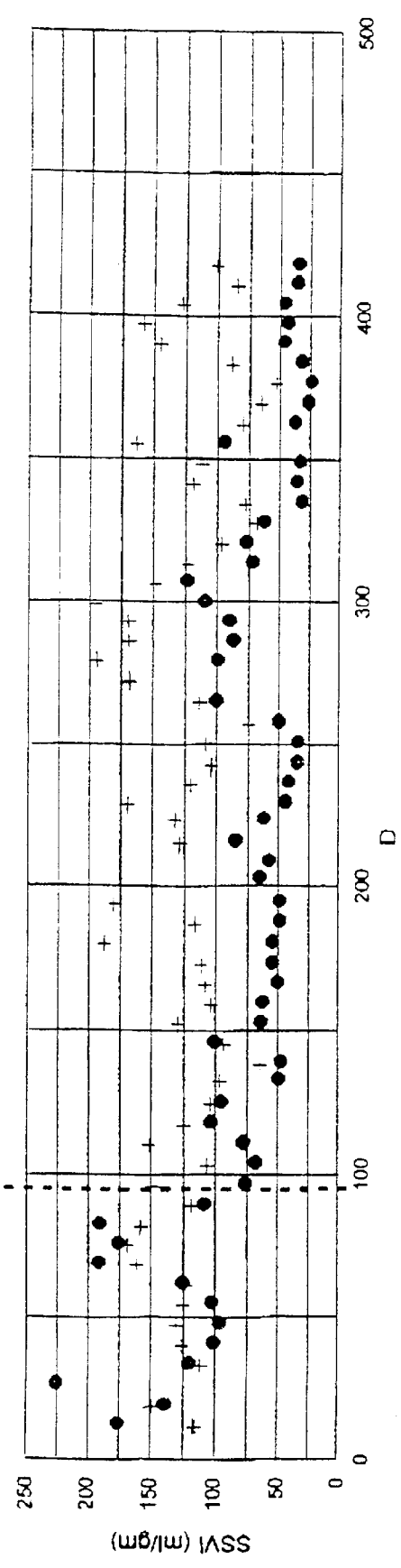
FIG. 4 is a plot of SSVI in mL/g as a function of time in days for Example 1, both for a method according to preferred embodiment of the present invention and for a control.

FIG. 4 is a plot of the SSVI as a function of time for, again, control Plants 1 and 2 (crosses) and Plants 3 and 4 (dots). The SSVI for Plants 3 and 4 was similar to that for Plants 1 and 2 up till the time ZELflocc dosing commenced, but was then significantly better. This result was interpreted as arising from the similar settled levels obtained in Plants 3 and 4 to those in Plants 1 and 2, but at considerably higher MLSS (as the SSVI is obtained from the settled level divided by the MLSS concentration).

FIG. 5 is a plot of the MLSS as a function of time for control Plants 1 and 2 (crosses) and Plants 3 and 4 (dots). Wile the MLSS in Plants 3 and 4 rose relative to that in Plants 1 and 2 almost immediately after ZELflocc dosing commenced, this difference became very much greater from late June 1998, when biological changes resulting from ZELflocc allowed satisfactory 30 minute settled levels to be obtained at significantly increased sludge ages in Plants 3 and 4.

FIG. 6 is a plot of the concentration of effluent ammonia as a function of time for control Plants 1 and 2 (crosses) and Plants 3 and 4 (dots). The increased sludge age in Plants 3 and 4 resulted in reduction of effluent ammonia to low levels, while ammonia levels in Plants 1 and 2 initially remained fairly constant. Ammonia levels in Plants 1 and 2 tended downward towards those obtained in Plants 3 and 4 in January 1999, when a period of good settleability in Plants 1 and 2 enabled sludge age to be increased, but this could not be maintained during a subsequent period of poorer settleability when sludge age had to be reduced again.

Prior to the use of ZELflocc, poor sludge settleability and inadequate clarifier capacity had limited the sludge age at which the plant could be operated to a level below which consistent nitrification was possible. These results demonstrate that substantial nitrification could be obtained consistently in a plant in which this was previously not possible.

EXAMPLE 2

In this example capacity for wet weather flow was the primary concern, as the works were being operated at sufficient sludge age to satisfy current and expected effluent quality requirements, including almost full nitrification and denitrification, but loading had reached the point where wet weather flows could cause excessive solids loss from the clarifiers.

As in Example 1, these works consisted of a number of parallel flow streams, but with each of the streams operated independently, as though there were five separate plants on one site. Plants A and B (which are identical) were operated as similarly as practicable except that Plant A was dosed with ZELflocc while Plant B was not, and hence was the control.

For convenience, ZELflocc was stored in a lime silo (available on site), slurried, and dosed into the feed stream to Plant A. Owing to range limitations on the dosing equipment available, dosing was carried out for a small period only each day (2.5 hours/day), but 7 days a week. (This differs from many sites which are unattended on. Saturdays and Sundays and so are given 7/5 times the daily required dose each weekday.)

As in Example 1, biomass plus incorporated ZELflocc was cycled through the reactor and clarifier many times per day, with sufficient ZELflocc being added each day to replace the quantity lost due to sludge wastage, necessary to maintain the desired sludge age of the system; thus, the ZELflocc dosage was adjusted in accordance with changes to the sludge age as these were deemed necessary.

Since the ZELflocc dosed plant (Plant A) and the control (Plant B) were operated as similarly as possible, apart from ZELflocc dosing, comparison is best made on the basis of settled level, and—because 20% ML settled levels are less susceptible to variations in MLSS concentration than undiluted samples—the results are shown in FIG. 7 as 20% ML settled levels for Plant A (solid line) and Plant B (dotted line) against time in days since dosing commenced.

The lower values obtained for Plant A (using ZELflocc) indicate improved settleability over Plant B (the control).

Further modifications may be made to the invention as would be apparent to persons skilled in the art, which may be made without departing from the ambit of the invention, the nature of which is to be ascertained from the foregoing description and the drawing.

What is claimed is:

1. A process for treating waste water in a reactor in order to remove contaminants, including:

mixing said waste water with a biomass, said biomass for consuming a quantity of said contaminants or adsorbing said contaminants;

dosing said waste water with a micronized zeolitic material;

mixing said zeolitic material with said biomass;

allowing solids to settle from said waste water;

discharging resultant effluent; and maintaining said zeolitic material at a sufficient level relative to said biomass to allow colonization of said zeolitic material by micro-organisms;

wherein a significant portion of said micronized zeolite material has a grain size less than or equal to 100 $\mu$m and said zeolitic material acts as a suspended growth support carrier for said micro-organisms.

2. A process as claimed in claim 1, wherein said zeolite material is natural zeolite.

3. A process as claimed in claim 1, wherein said biomass comprises microscopic organisms.

4. A process as claimed in claim 1, wherein said reactor comprises one or more compartments, and the process includes recycling the biomass from one compartment to another.

5. A process as claimed in claim 1, wherein a portion of said biomass is aerobic, anoxic or anaerobic, or a mixture of these.

6. A process as claimed in claim 1, wherein a portion of said biomass is one of: aerobic, anoxic, anaerobic, or a mixture of these, during part of the process but not during other parts of the process.

7. A process as claimed in claim 1, wherein said micronized material is added as a dry powder or as a slurry.

8. A process as claimed in claim 1, wherein said micronized material is added at a uniform rate, or adjusted to match waste water in flow rate, or added in slug doses once or a number of times.

9. A process as claimed in claim 1, including dosing directly into a reactor in which the process is performed, or into a sludge recirculation line, or into a channel, part or container upstream of the reactor.

10. A process as claimed in claim 1, including separating said solids in the reactor during a period of quiescence or in a separator unit, such as a clarifier, into which the contents of the reactor have previously been transferred for separation.

11. A process as claimed in claim 1, including monitoring the settleability of the solids.

12. A process as claimed in claim 1, including retaining the biomass in the reactor for from about one to two days up to about thirty to forty days or longer, and regularly wasting a proportion of the biomass to compensate for the introduction of new inputs and growth of the biomass.

* * * * *